US008358341B2

(12) United States Patent
Trenary et al.

(10) Patent No.: US 8,358,341 B2
(45) Date of Patent: Jan. 22, 2013

(54) METHOD FOR INTELLIGENT SCANNING USING A TOTAL STATION

(75) Inventors: Shane Trenary, Springfield, OR (US); Jinglin Kuang, Corvallis, OR (US)

(73) Assignee: Trimble Navigation Limited, Sunnyvale, CA (US)

( * ) Notice: Subject to any disclaimer, the term of this patent is extended or adjusted under 35 U.S.C. 154(b) by 532 days.

(21) Appl. No.: 12/573,028

(22) Filed: Oct. 2, 2009

(65) Prior Publication Data
US 2011/0080477 A1  Apr. 7, 2011

(51) Int. Cl.
*H04N 7/18* (2006.01)
*H04N 13/00* (2006.01)
*G06K 9/00* (2006.01)
(52) U.S. Cl. ............................ 348/135; 382/109; 348/42
(58) Field of Classification Search ........................ None
See application file for complete search history.

(56) References Cited

U.S. PATENT DOCUMENTS

| 5,600,732 | A  | * | 2/1997  | Ott et al. ....................... 382/112 |
| 6,774,905 | B2 | * | 8/2004  | Elfving et al. ................. 345/581 |
| 7,023,487 | B1 | * | 4/2006  | Adams ........................... 348/448 |
| 7,750,970 | B2 | * | 7/2010  | Ide et al. ......................... 348/345 |
| 8,045,762 | B2 | * | 10/2011 | Otani et al. .................... 382/109 |

* cited by examiner

*Primary Examiner* — Wen-Tai Lin
(74) *Attorney, Agent, or Firm* — Kilpatrick Townsend & Stockton LLP

(57) ABSTRACT

System and method for scanning an object using a surveying instrument is provided. The method includes designating an area associated with an object to be scanned. Defining one or more sections within the area associated with the object. Scanning a portion of the area associated with the object corresponding to a first section of the area associated with the object and designating one or more sections adjacent to the first section if scan results indicate presence of an object. Designating one or more sections adjacent to the first section for not scanning if the scan results of the portion of the area associated with the object corresponding to the first section do not indicate presence of an object. A remote control device is provided that can control the surveying instrument, receive the scan results, and analyze the scan results for subsequent use.

20 Claims, 9 Drawing Sheets

METHOD FOR INTELLIGENT SCANNING USING A TOTAL STATION

BACKGROUND

The present invention relates to an optical instrument and a method for efficiently scanning objects.

Use of surveying instruments in scanning land-based objects is prevalent. One such surveying instrument that can be used is the Total Station manufactured by Trimble Navigation Limited. Surveying is the science and art of making all essential measurements to determine the relative position of points and/or physical and cultural details above, on, or beneath the surface of the Earth, and to depict them in a usable form, or to establish the position of points and/or details.

Land surveying can include associated services such as mapping and related data accumulation, construction layout surveys, precision measurements of length, angle, elevation, area, and volume, as well as horizontal and vertical control surveys, and the analysis and utilization of land survey data. Accurately mapping the various objects in a land-based survey is essential to establish the scope of any construction project.

In particular, when scanning an object, the current scanning techniques requires that the user define the area that is not to be scanned in addition to defining the area to be scanned. This prolongs the setup of the surveying instrument and makes it more difficult to accurately configure the surveying instrument. In addition, conventional scanning devices define the area to be scanned as a simple rectangle since this is relatively easy to set-up and configure. In an instance where a stockpile is to be scanned, defining the area to be scanned using a rectangle results in unnecessary scanning of the "open areas" within the defined area (rectangle) that are not occupied by the stockpile. Such "open area" scans are very time consuming and expensive since it takes a particularly long time for a surveying instrument to determine that it is scanning an "open area". Alternatively, a user has to precisely define the area not to be scanned in order to prevent "open area" scanning Defining such area requires a high level of precision that can significantly increase the time needed for configuring the surveying instrument thereby resulting in increased costs for performing the survey. In addition, if the "open area" is not defined properly, e.g., if the defined open area overlaps with the actual object area, there is a risk that certain portion(s) of the actual object may not be scanned resulting in erroneous data being reported.

Embodiments of the present invention address this and other shortcomings of conventional scanning methods.

SUMMARY

An embodiment of the present invention provides a method for scanning an object. The method includes defining a set of coordinates to identify an area associated with the object, defining a plurality of sections within the area where the plurality of sections form an array. The array has one or more rows and each of the rows has one or more sections. The method further includes positioning a scanning element of the total station to image a portion of the area associated with the object that corresponds to a first section of the first row, designating one or more sections adjacent to the first section for subsequent scanning if a result of scanning the first section of the first row indicates presence of a first portion of the object, and repeating the above steps for subsequent sections of the first row. The method further includes positioning the scanning element to image a portion of the area associated with the object that corresponds to a first section of the second row, designating one or more sections adjacent to the first section of the second row for subsequent scanning if it is determined that the first section of the second row indicates presence of a second portion of the object, and not scanning one or more sections adjacent to the first section of the second row if it is determined that the first section of the second row does not indicate presence of a portion of the object. These steps may be repeated for subsequent sections of the second row and all the remaining rows.

In another embodiment, an apparatus for scanning an object is provided. The apparatus includes a surveying instrument that has an optical imaging device configured for scanning an object. The surveying instrument further includes a display device and a processor. The processor is configured to receive input defining an area associated with the object, the area being defined as an array having one or more rows. Each row of the array may include a plurality of sections. The processor may instruct the optical imaging device to scan a portion of the area associated with the object that corresponds to a first section from among the plurality of sections. The processor can determine if scan result of the first section indicates presence of a portion of the object. If the processor determines that the scan result of the area associated with the object that corresponds to the first section indicates presence of the portion of the object, the processor can designate one or more sections adjacent to the first section for subsequent scanning.

In yet another embodiment, a method for scanning an object using a surveying instrument is provided. The method includes defining an area associated with the object in a two-dimensional space and including a plurality of rows and columns. Each row of the area includes a plurality of sections and wherein each section in the plurality of sections corresponds to a portion of the area associated with the object. The method further includes designating a first row, from among the plurality of rows, for scanning, to determine presence of at least a portion of the object and scanning an area of the object corresponding to a first section of the first row to determine presence of at least a portion of the object. In addition, the method includes designating one or more sections adjacent to the first section for subsequent scanning if it is determined that scan result of the area of the object corresponding to the first section indicates presence of a portion of the object.

In yet another embodiment, a system for scanning an object is provided. The system includes a surveying instrument having an imaging device and a first device coupled to the surveying instrument and including a display unit and a controller. The controller of the first device is configured to send a first instruction to the surveying instrument, the first instruction defining an area associated with an object to be scanned, wherein the area includes a plurality of sections arranged in a plurality of rows. The controller is further configured to send a second instruction to the surveying instrument, the second instruction instructing the surveying instrument to scan a portion of the area associated with the object that corresponds to a first section, from among the plurality of sections and receive input from the surveying instrument indicating presence or absence of a portion of the object in the portion of the area associated with the object that corresponds to the first section. If the input indicates presence of the portion of the object in the portion of the area associated with the object that corresponds to the first section, the controller may send a third instruction to the surveying instrument instructing the surveying instrument to scan one more sections adjacent to the first section.

The following detailed description, together with the accompanying drawings will provide a better understanding of the nature and advantages of the present invention.

DETAILED DESCRIPTION OF SPECIFIC EMBODIMENTS

Figure 1:
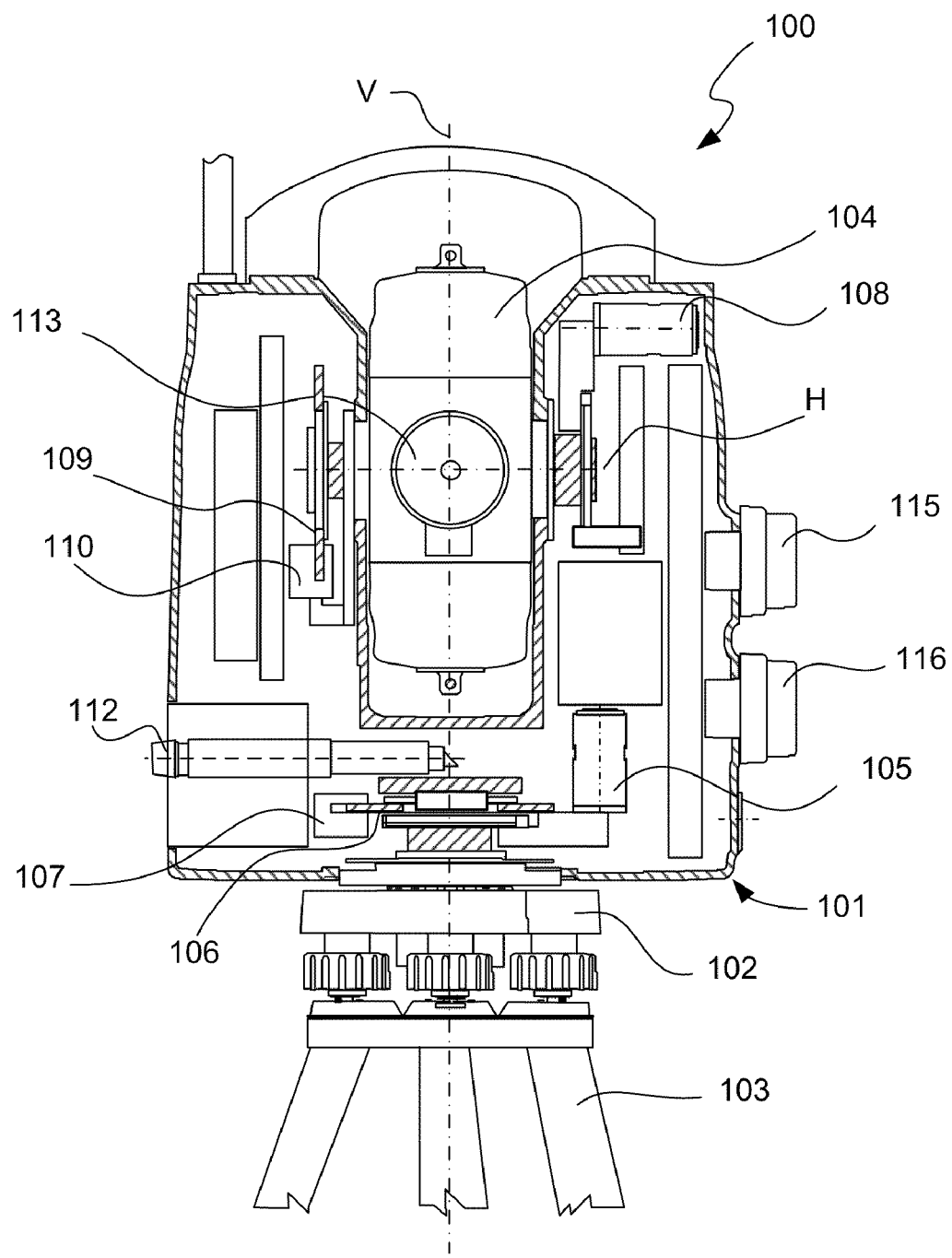
FIG. 1 illustrates a schematic diagram of a surveying instrument according to one embodiment of the invention.

FIG. 1 shows a schematic diagram of a surveying instrument that may be used to implement the method according to an embodiment of the present invention. The surveying instrument 100 comprises an alidade 101 mounted on a base 102, and has a mounting support structure in the form of a tripod 103. The alidade 101 can be rotated about a vertically oriented rotation axis V, in order to aim the instrument in any desired horizontal direction. In the alidade, there is a center unit 104, which can be rotated about a horizontally oriented rotation axis H, in order to aim the instrument in any desired vertical direction. Measurements made using the surveying instrument 100 are typically related to an origin of coordinates located at the intersection between the vertically oriented and the horizontally oriented rotation axes V and H.

A drive mechanism 105 is provided for rotating the alidade about the vertically oriented rotation axis in order to aim the instrument in any desired horizontal direction. The rotational position of the alidade 101 is tracked by means of a graduated disc 106 and a corresponding angle encoder or sensor 107. For rotation of the center unit 104 about the horizontally oriented rotation axis H, a similar drive mechanism 108, graduated disc 109, and sensor 110 are provided. Moreover, the instrument has an optical plummet 112, which gives a downwards view along the vertically oriented rotation axis V. The optical plummet is used by the operator to center or position the instrument above any desired point on the ground.

The instrument line of sight is centered at the intersection between the vertical and the horizontal rotation axes, and this can be seen in the figure where these axes cross in the center of a telescope 113 in the center unit 104.

The instrument 100 can also comprise a display device (not shown) for displaying the area to the scanned. The display may be an integral part of the instrument or may be included in a removable control panel that can be used for remote control of the instrument via short-range radio. Some surveying instruments may be fully remote controlled, wherein the display may be in the form of a computer screen located far away from the surveying instrument and information to and from the instrument to the computer is transferred over a wireless medium or a radio telephone network. In addition, the surveying instrument may be equipped with Global Navigation Satellite Systems (GNSS) capability to enable the instrument to locate its position in 3-D coordinates.

Alternatively, the instrument can also be manually operated for aiming towards a desired target using vertical and horizontal motion servo knobs 115 and 116. Telescope 113 of the instrument is operable to scan objects from different positions and orientations of the surveying instrument.

The surveying instrument also comprises a CPU and associated firmware (not shown) that is capable of performing various measurements. Some of the tasks that the CPU is capable of performing are, instructing the telescope (or imaging device) to point at a designated section of the area to be scanned and instructing the telescope to scan an area corresponding to the section. The CPU can determine whether the scan results of the area corresponding to the designated section indicates presence or absence of a portion of an object. If the scan results indicate presence of an object, the CPU can display that information on the display.

A computer program code implemented in the CPU can then be used to analyze the scan results and determine presence of an object and perform further actions based on indication of a presence or absence of the object. However, implementation may also be made using dedicated hardware, such as a special purpose microprocessor or a digital signal processor (DSP), firmware, or similar.

Scanning of an object using a surveying instrument often involves calculating a distance and angle of one or more points associated with that object, in relation to the location of the surveying instrument.

Figure 2:
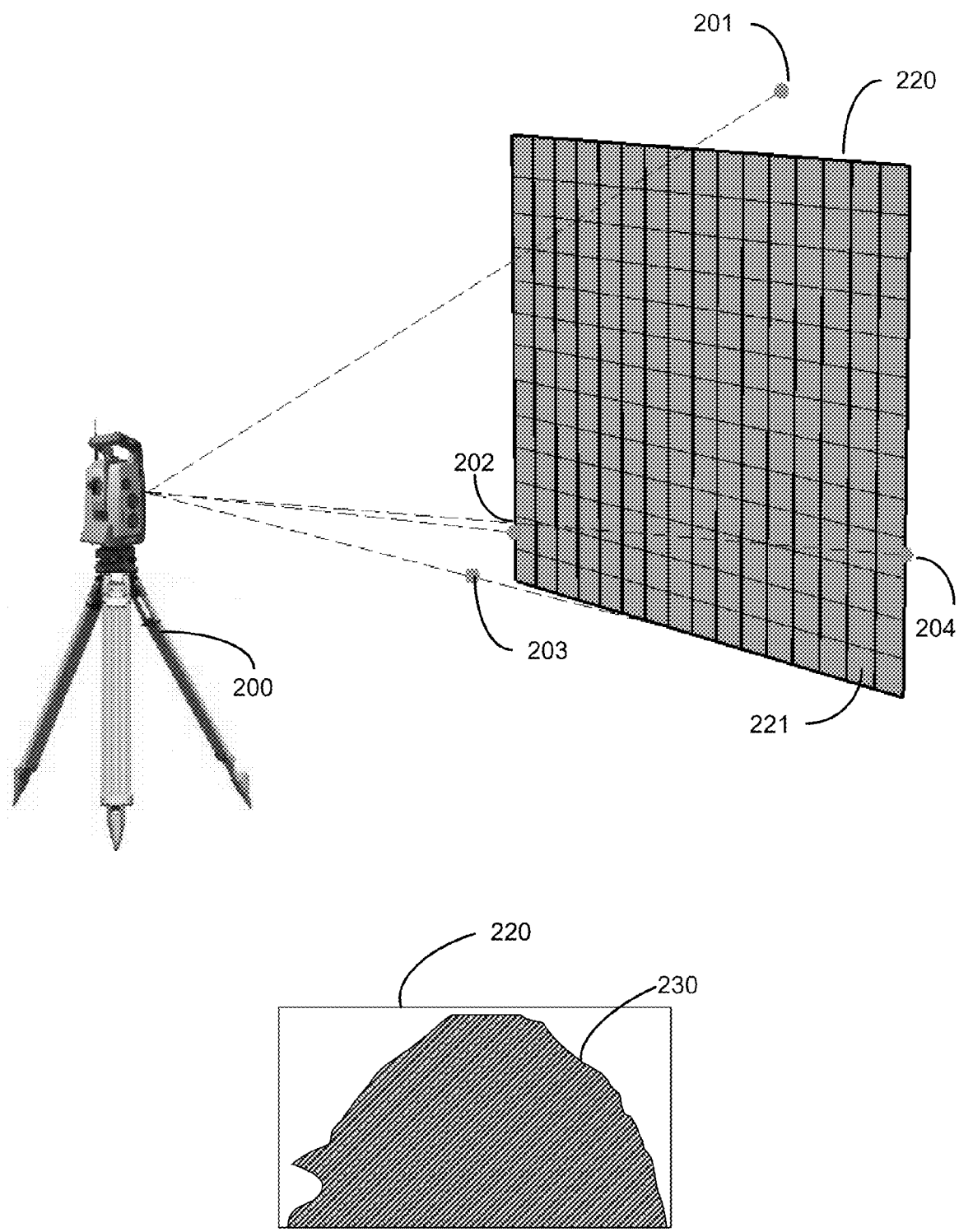
FIG. 2 illustrates an area associated with an object to be scanned according to an embodiment of the present invention.

FIG. 2 illustrates an object 230, e.g., a stockpile, which is to be scanned by a scanning instrument 200, e.g., a surveying instrument like the Total Station, according to an embodiment of the present invention. In order to explain the method for scanning an object as described herein, a dome-shaped object 230 is illustrated. One skilled in the art will realize that the object to be scanned may be of any size and/or shape. Prior to scanning object 230, surveying instrument 200 may define an area 220 associated with object 230. In an embodiment, area 220 associated with the object may be defined using one or more points that establish the boundary for the scanning area. For example, points 201, 202, 203, and 204 in FIG. 2 establish a rectangular area 220 associated with the object. It is to be noted that the area associated with the object need not be rectangular. The area associated with the object may be of any other shape and may depend on the size and/or shape of the object to be scanned. For ease of explanation, the area associated with the object is shown to be rectangular in the following description of the various embodiments of the present invention.

In some embodiments, a user of the surveying instrument may initially define area 220 associated with the object and program surveying instrument 200 by providing the coordinates of boundary points 201-204. The coordinates of the boundary points may be provided using a two-dimensional or a three-dimensional coordinate system. Boundary points 201-204 may be defined in several ways. For example, in some embodiments, boundary points 201-204 may be the top-most, bottom-left, bottom-most, and bottom-right points, respectively, that define a two-dimensional plane. In addition, the vertical and horizontal distances between the boundary points may be defined. In another embodiment, boundary points 201-204 may represent the diagonal corner points of a two-dimensional plane with the horizontal and vertical distances between them defined. Although only four boundary points are illustrated in FIG. 2, one skilled in the art will realize that any number of points needed to define area 220 associated with the object may be used. In one embodiment, the GNSS feature of surveying instrument 200 may be used to verify the location of surveying instrument 200 and the one or more boundary points may be defined in relation to the position of the surveying instrument 200. Once surveying instrument 200 receives the coordinates, it can map area 220 associated with the object and display it on a display device included in surveying instrument 200 along with other relevant information. In some embodiments, surveying instrument 200 may divide area 220 associated with the object into one or more sections 221. The size and shape of sections 221 may depend on the shape of area 220 associated with the object. In the illustration of FIG. 2, sections 221 are shown as squares, but they can be of any geometrical shape suitable for dividing area 220 associated with the object as long as the sections completely consume area 220 associated with the object without leaving any empty spaces therein. Once area 220 associated with the object is divided, each section 221 corresponds to a portion of area 220 associated with the object.

As seen in FIG. 2, area 220 associated with the object is bigger than object 230. As illustrated, in some instances, object 230 may not fully occupy area 220 associated with the object. The unoccupied portions of area 220 associated with the object can be referred to as open areas or "sky." As described earlier, conventional methods of scanning are expensive since a significant amount of time is wasted in scanning such "sky" areas around objects. One of the advantages of the scanning technique described below is that it eliminates or minimizes scanning of the "sky" areas around objects, thereby increasing the scanning speed and lowering the costs of scanning Moreover, conventional surveying instruments can implement this technique, obviating the need for more expensive image-based surveying equipment in small, budget-constrained projects.

FIGS. 3A-3M illustrate a scanning process 300 according to an embodiment of the present invention. FIGS. 3A-3M are graphical indications of scanning process 300. The graphical illustrations of FIGS. 3A-3M may be presented on the display device of the surveying instrument or an external display coupled to the surveying instrument. For ease of description, we will describe the scanning process in relation to an object 302 and an area 301 associated with object 302. FIGS. 4A and 4B show a high-level flow chart of a process 400 for scanning object 302 according to an embodiment of the present invention.

At step 401, area 301 associated with object 302 is defined using the technique described above. In an embodiment, area 301 may be defined in a two-dimensional plane. In other embodiments, area 301 may be defined in a 3-dimensional space. At step 402, the area 301 may be divided into one or more sections as described above. In some embodiments, the sections may be arranged as an array having rows and columns. Each of the sections has its own location information, e.g., coordinates, and corresponds to a portion of the area 301.

It is to be noted that references to scanning a portion of area associated with the object in the application refer to scanning portions of the actual object or portions of area surrounding the object that correspond to the portions of the area associated with the object, e.g., area 301, displayed on the display device.

Figure 3A:
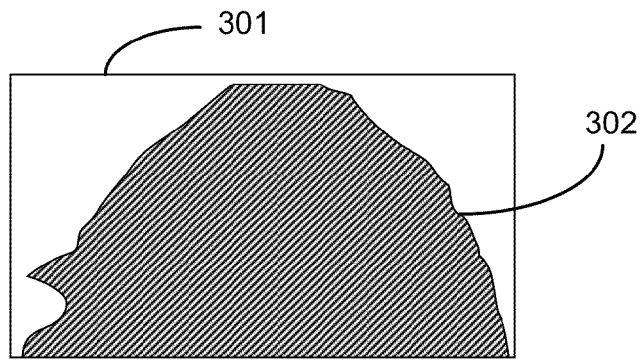
FIGS. 3A-3M are graphical representations of a method for scanning an object according to an embodiment of the present invention.
Figure 3B:
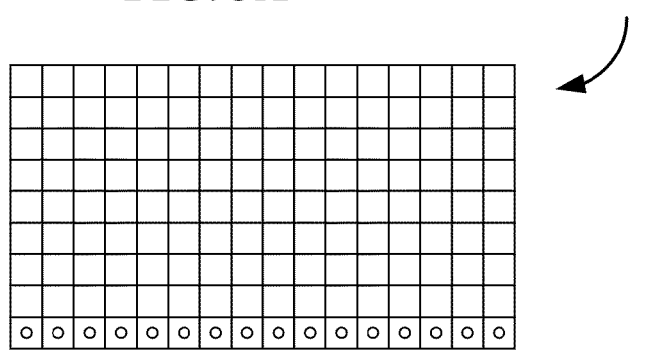

A first row of the array representing area 301 is designated for scanning FIG. 3B illustrates the designation wherein each section of a first row of the array is marked with an "o" symbol. It is to be noted that "o" symbol is used herein to merely indicate the sections marked for scanning One skilled in the art will realize that any other suitable marking scheme may be used including shapes, colors, letters, symbols, empty space, or the like. In some embodiments, after step 402, all the sections of the array may be designated for not scanning as default. Subsequently, a portion of the area associated with the object that corresponds to the first row of the array may be designated for scanning. At step 403, the scanning element of the surveying instrument, e.g., the telescope, is aimed at the object at a location corresponding to a first section in the first row of area 301. It is to be noted that the first section may correspond to a portion of the object or may correspond to "sky" area surrounding the object. A portion of area 301 corresponding to the first section is scanned to determine presence or absence of a portion of object 302, at step 404. At step 405, the surveying instrument determines whether the portion of area 301 corresponding to the first section is associated with some portion of the object or not based on the results of the scan. If it is determined that the portion of area 301 corresponding to the first section is associated with some portion of the object, the first section is marked as being associated with some portion of object 302. If the surveying instrument determines that the portion of area 301 corresponding to the first section is not associated with some portion of object 302, i.e. it is "sky", the first section is appropriately marked to indicate that. FIGS. 3B-3M, use different patterns to show sections that are associated with "sky" and sections that are associated with some portion of the object. It is to be noted that the patterns shown in FIGS. 3B-3M are for illustration purposes only and any other type of marking may be used to distinguish the "sky" sections from sections associated with some portion of the object including use of symbols, colors, letters, numbers, shapes, empty space, and the like.

Figure 3C:
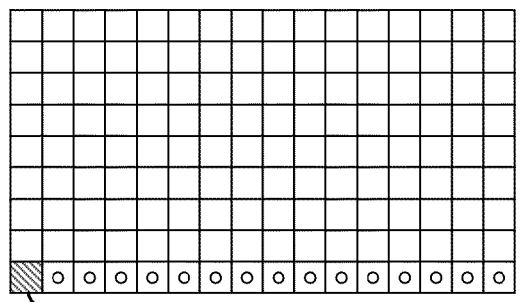
Figure 3D:
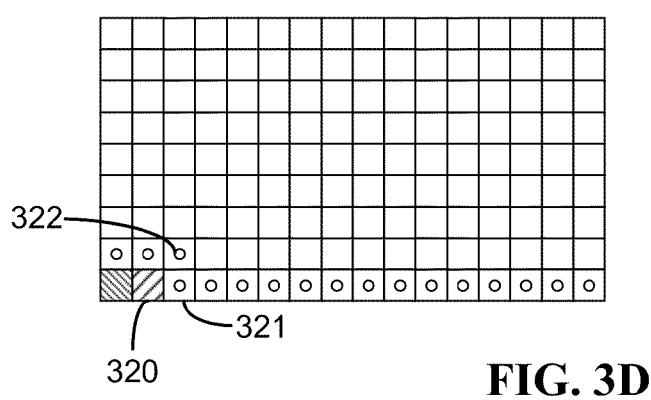
Figure 3E:
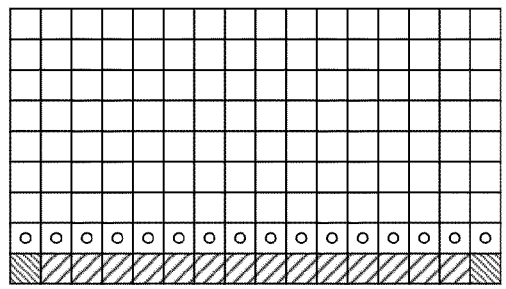
Figure 3F:
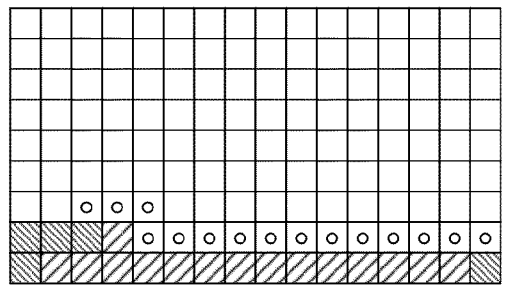
Figure 3G:
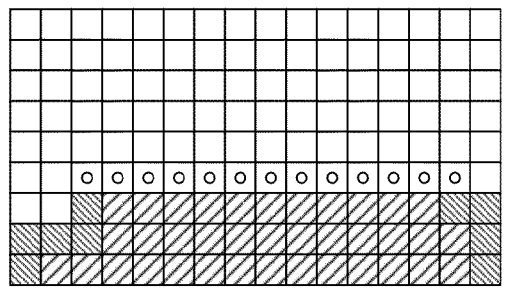
Figure 3H:
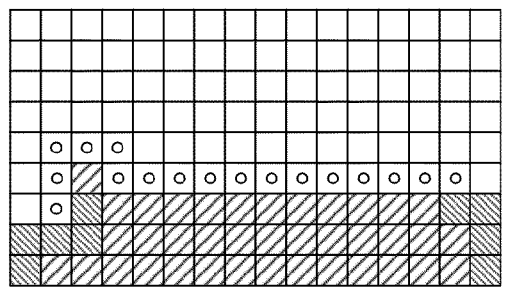
Figure 3I:
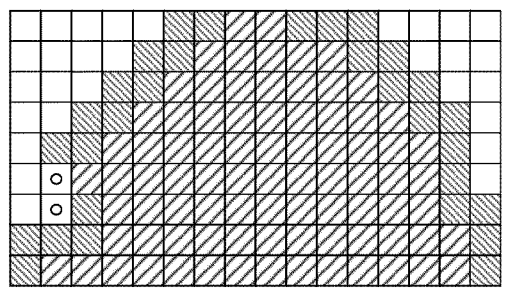
Figure 4A:
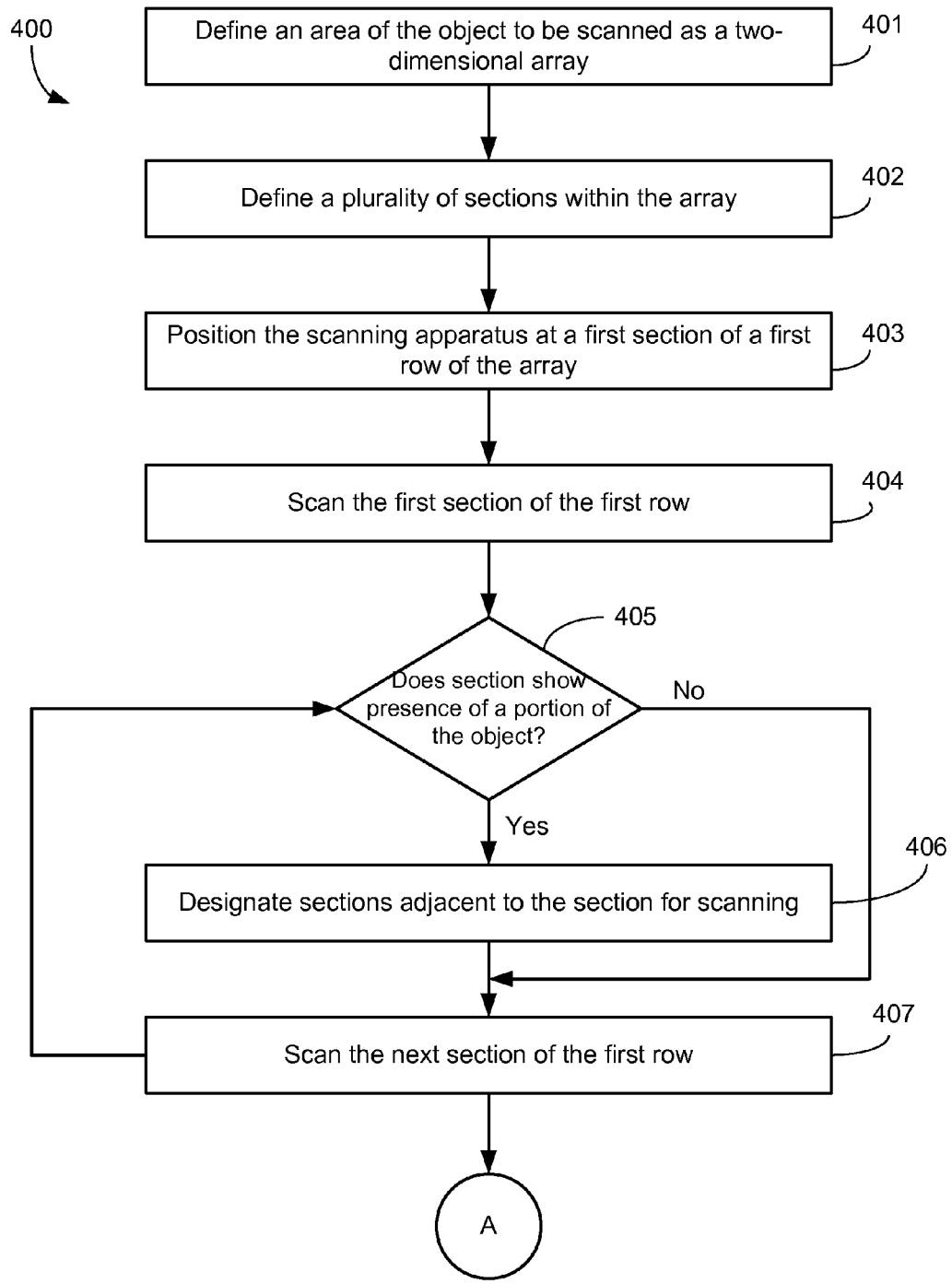
FIGS. 4A and 4B illustrate high-level flow diagrams of a process for scanning an object according to an embodiment of the present invention.
Figure 4B:
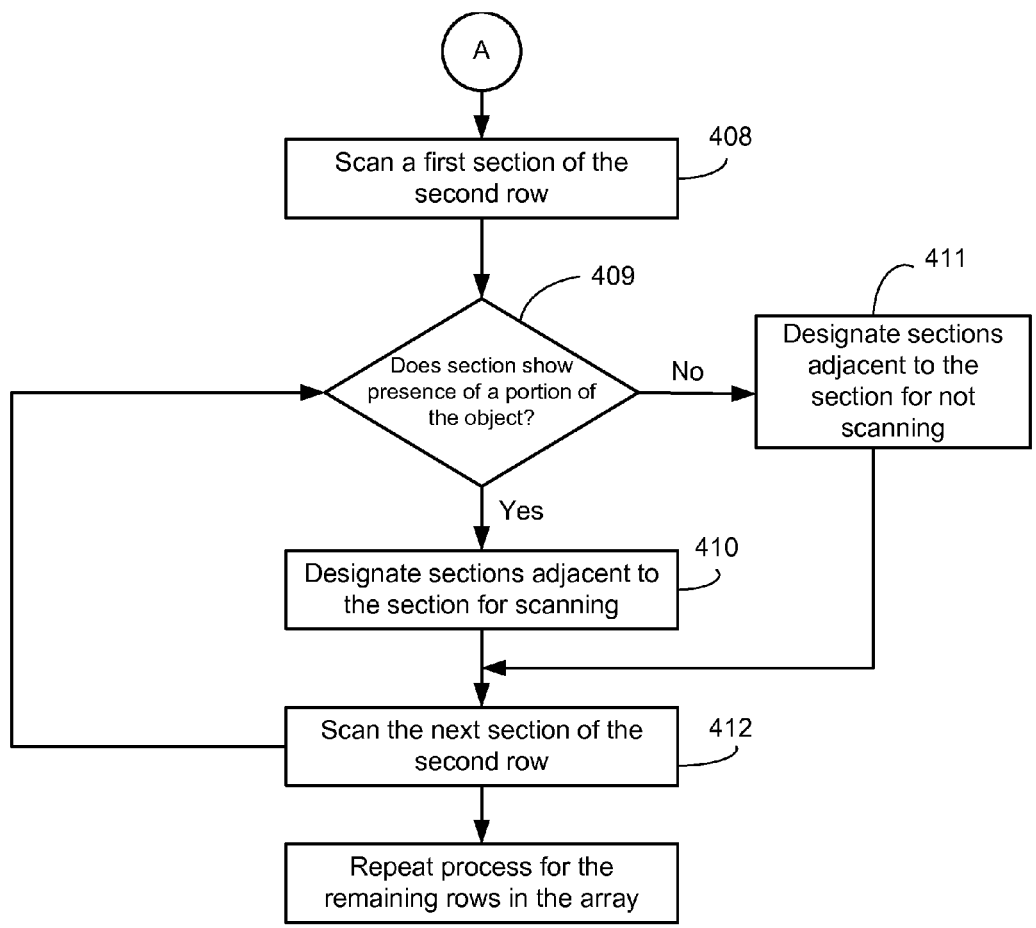

In addition, if the scanning result indicates that the portion of area 301 corresponding to the first section is associated with some portion of the object, the sections adjacent to first section are marked for subsequent scanning at step 406. Scanning of an area to determine presence or absence of an object within that area is well known in the art, the discussion of which is omitted here for conciseness. If the scanning results indicate that there is no object present in the portion of area 301 corresponding to the first section, the surveying instrument scans a portion of area 301 corresponding to a second section in the first row at step 407 and determines whether the portion of area 301 corresponding to the second section is associated with a portion of the object or not at step 405. For example, FIG. 3C shows a section 310 of the first row as not being associated with a portion of the object, while FIG. 3D shows a section 320 of the first row as being associated with some portion of the object. In such a case, the sections adjacent to section 320 are marked for scanning However, for the first row of the array, portions of area 301 corresponding to all the sections are scanned irrespective of whether the can result indicates presence of a portion of the object or not. This is done to get some baseline measurements on the meets and bounds of the object. Steps 405-407 may be repeated until a portion of area 301 corresponding to the entire first row is scanned.

In some embodiments, if the scan results for the portion of area 301 corresponding to the entire first row indicates absence of a portion of the object, a portion of area 301 corresponding to a second row in the array is scanned using the same logic of the first row as described above, e.g., portion of area 301 corresponding to all the sections is scanned irrespective of whether the can result indicates presence or absence of a portion of the object. If the portion of area 301 corresponding to the second row also does not indicate presence of any portion of the object, each subsequent row is scanned using the same logic as the first row until the surveying instrument receives a scan result that indicates presence of some portion of the object.

Once the portion of area 301 corresponding to the entire first row is scanned and results are recorded, the surveying instrument may be aimed at a portion of area 301 corresponding to a first section in the second row of the array at step 408. The portion of area 301 corresponding to the first section of the second row is scanned. At step 409, a determination is made whether the scan results indicate that the portion of area 301 corresponding to the first section of the second row is associated with a portion of the object. If it is determined that the portion of area 301 corresponding to the first section of the second row is associated with a portion of the object, the sections adjacent to the first section of the second row are marked for subsequent scanning at step 410. If the scan results of the portion of area 301 corresponding to the first section of the second row indicate that the portion of area 301 corresponding to the first section of the second row is not associated with a portion of the object, the surveying instrument may designate sections adjacent to the first section of the second row for not scanning at step 411 and proceed to scan the next section of the second row at step 412. In some embodiments, where all the sections are initially marked "not to be scanned", absence of a portion of the object in a particular section will not result in the surveying instrument designating adjacent sections as not be scanned since they will already be marked not to be scanned. Steps 409-412 can be repeated for the remaining rows of the area 301 associated with object 302. FIGS. 3E-3I illustrate the scanning process that may be performed to scan the entire object 301.

Figure 3J:
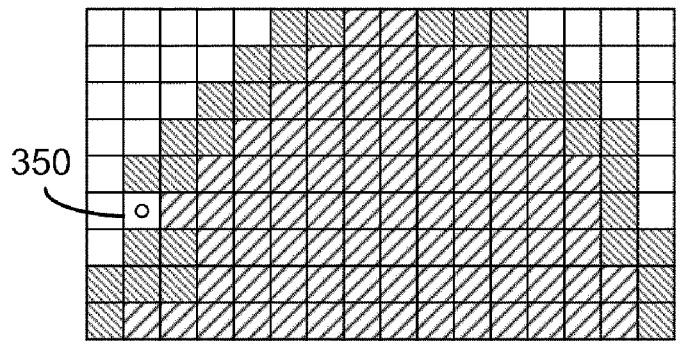
Figure 3K:
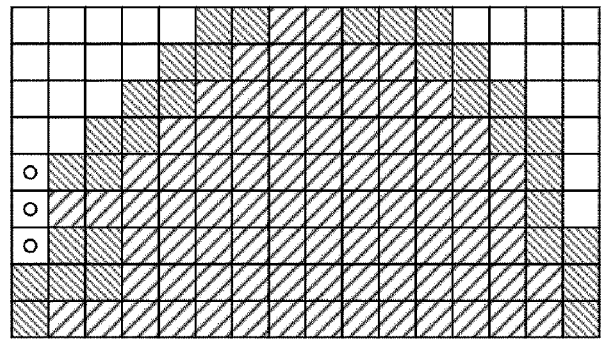
Figure 3L:
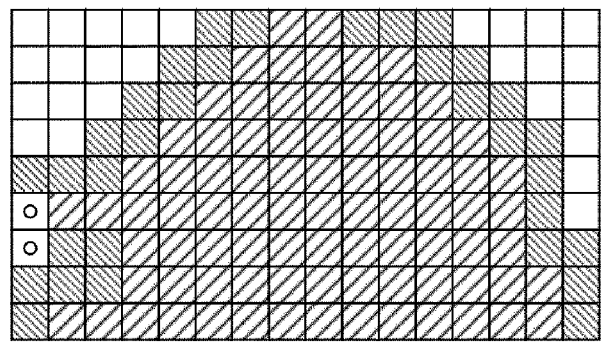
Figure 3M:
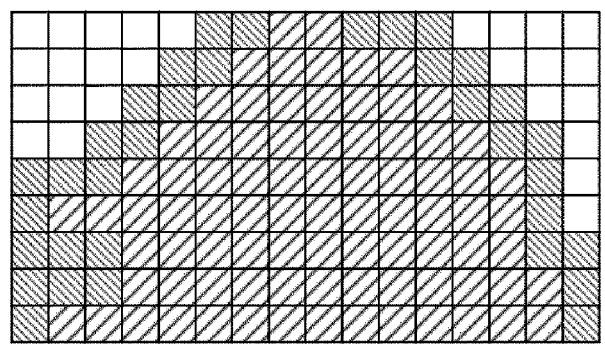

In some embodiments, after all the rows have been scanned, process 400 may determine if there are any sections that are designated "to be scanned" but not actually scanned. For example, in the instance where there is some portion of the object that hangs from the object, there may be sections that are marked "to be scanned" but may not actually be scanned during the first pass of process 400. FIG. 3J-3M illustrate a scenario where there is some portion of the object that protrudes out from the object. In such an instance, when a portion of area 301 corresponding to all the rows of the array are scanned, the surveying instrument may determine if there are portions of area 301 corresponding to one or more sections that were designated to be scanned but were not scanned in the first pass. Section 350 in FIG. 3J illustrates a section that is designated "to be scanned" but was not scanned during the first pass. If it is determined that there are one or more sections that are designated for scanning but were not scanned in the first pass, process 400 may be repeated until portions of area 301 corresponding to all sections that are designated to be scanned are actually scanned. FIGS. 3J-3M illustrate this embodiment. In some embodiments, process 400 may be repeated multiple times in order to ensure that all the sections designated "to be scanned" are actually scanned.

In some embodiments, the surveying instrument can re-scan the portions of area 301 corresponding to sections that were previously marked for not scanning and repeat process 400 for all such sections. The number of re-scans may depend on the level of accuracy needed, the size and shape of the object and the application environment. For instance, a general survey to determine a coarse topography of a piece of land may tolerate less accuracy and hence no re-scans may be necessary while a construction project that involves moving large amount of material off the construction site may need more accurate calculations and hence multiple re-scans.

In some embodiments, after the area 301 associated with the object is defined at step 402, all the sections within the area may be marked as "not to be scanned." If the surveying instrument scans a portion of area 301 corresponding to a section of the array and determines that the portion of area 301 corresponding to the section is not associated with a portion of the object, one or more sections adjacent to that section are not designated for "not scanning" because such sections will already be marked as "not to be scanned" as described above. In some embodiments, if a portion of area 301 corresponding to a section is determined to be not associated with a portion of the object and one or more sections adjacent to that section are designated to be scanned based on a previous scanning operation, the designation of sections that are previously marked as "to be scanned" is not changed even if scanning of the portion of area 301 corresponding to the current section indicates absence of a portion of the object and the previously marked sections are adjacent to the current section. For example, in FIG. 3D, if section 320 indicates presence of a portion of the object, section 322, which is adjacent to section 320, is designated to be scanned. Now, if scanning of section 321 indicates that section 321 is not associated with a portion of the object, the designation of section 322 is not changed. Section 322 is subsequently scanned to determine presence or absence of a portion of the object.

It should be appreciated that the specific steps illustrated in FIG. 4 provide a particular method of scanning an object according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

In some embodiments, the scanning of the object may be performed starting from the left end of the object and moving horizontally to the right end of the object. Alternatively, the scan can be performed starting on the right end of the object and moving towards the left end, top to bottom, bottom to top, alternating between left to right and right to left, or any other manner that may provide the most efficient scanning In some embodiments, the first row of the area associated with the object may be the bottom-most row. In an alternate embodiment, the first row may be the top-most row. In some embodiments, non-ground-based objects can also be scanned in a similar manner. In this instance, a top row may be scanned first followed by a row below the top row and so on until the bottom-most row is reached.

Figure 5:
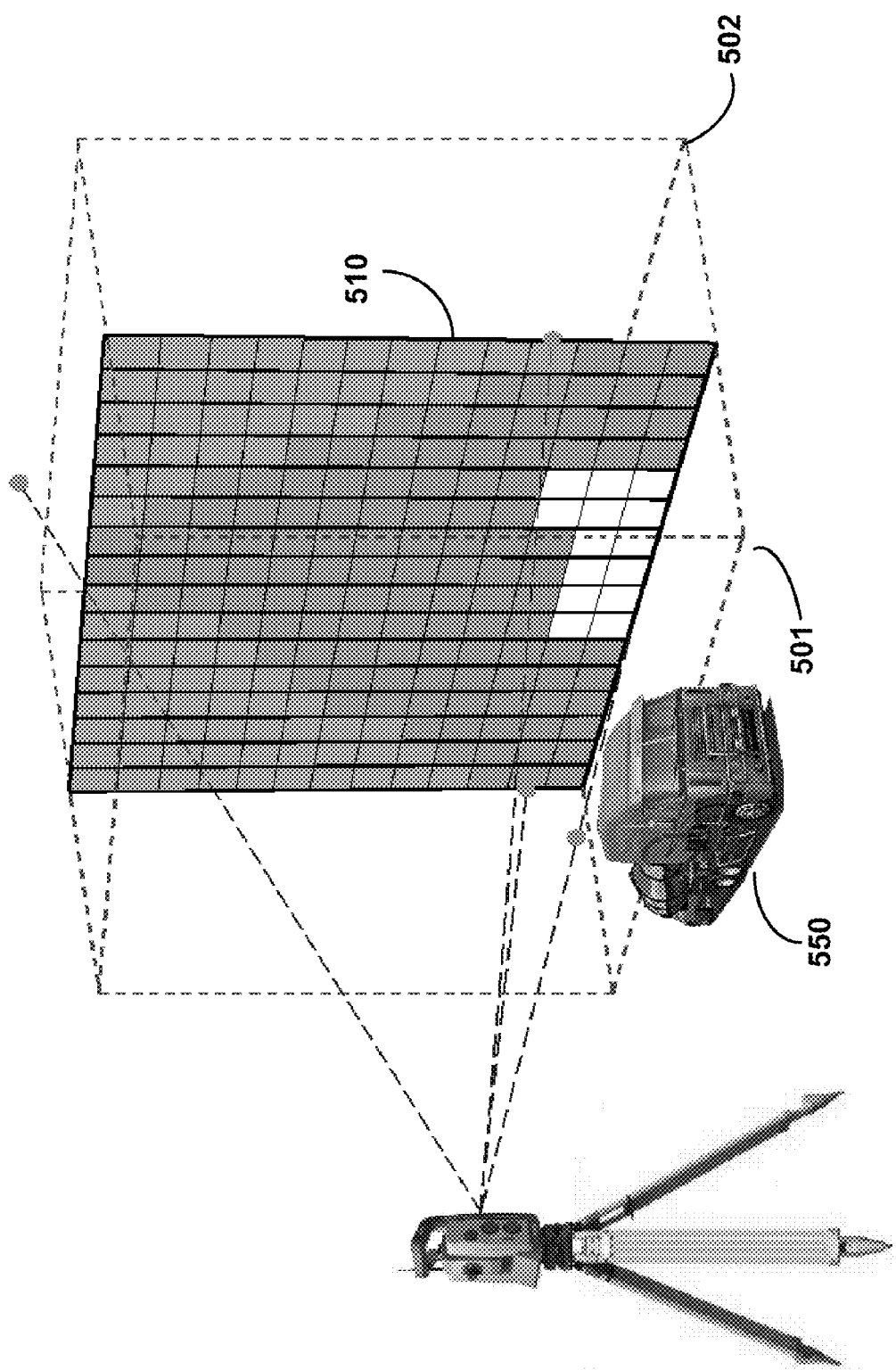
FIG. 5 is illustrates a minimum and maximum distance that can be designated for scanning an object according to an embodiment of the present invention.

In some embodiments, a minimum scan distance 501 and a maximum scan distance 502 can be defined as illustrated in FIG. 5. Minimum scan distance 501 may be a location just in front of the object to be scanned. Maximum scan distance 502 may be a location just behind the object to be scanned. The purpose of defining minimum scan distance 501 and maximum scan distance 502 is to define the depth of the object to be scanned thereby further increasing the speed and efficiency of the scanning process. For instance, during the scanning process, if the surveying instrument detects presence of a portion of an object within the plane of area 510 associated with the object and in addition determines that the detected portion of the object is closer than minimum distance 501 or farther than maximum distance 502, the reading may be ignored and not registered on the display. For example, if there is wall behind the object to be scanned, maximum distance 502 may be set to be between the object and the wall. During the scanning process, the surveying instrument will scan a portion of the wall not covered by the object but since that portion is beyond the maximum distance defined, the scan results for that portion of the wall will be ignored and not recorded as a portion of the object. Thus, implementing a minimum and maximum distance as part of the scanning process may advantageously eliminate the possibility of extraneous objects being registered as part of the object to be scanned.

In some embodiments, if there is an obstacle 550 in front of the object, the surveying instrument will record the presence of obstacle 550 and mark the area occupied by obstacle 550 as part of area 510. For example, as illustrated in FIG. 5, area occupied by obstacle 550 is represented in area 510 by white blank squares. As discussed earlier, any other marking scheme may be used to represent the area occupied by the obstacle. If the obstacle is closer than the minimum distance or farther than the maximum distance, the readings from the obstacle may be ignored as described above.

In some embodiments, the surveying instrument may communicate with a remote control device. The remote control device may be capable of remotely controlling the surveying equipment and may communicate with the surveying equipment using any of the wired or wireless communication channels. The remote control device may be capable of receiving data from the surveying equipment and may perform data analysis. In some embodiments, the remote control device may provide inputs to the surveying equipment, e.g., the boundary points, to define an area associated with the object to be scanned and inputs to operate the surveying instrument.

Figure 6:
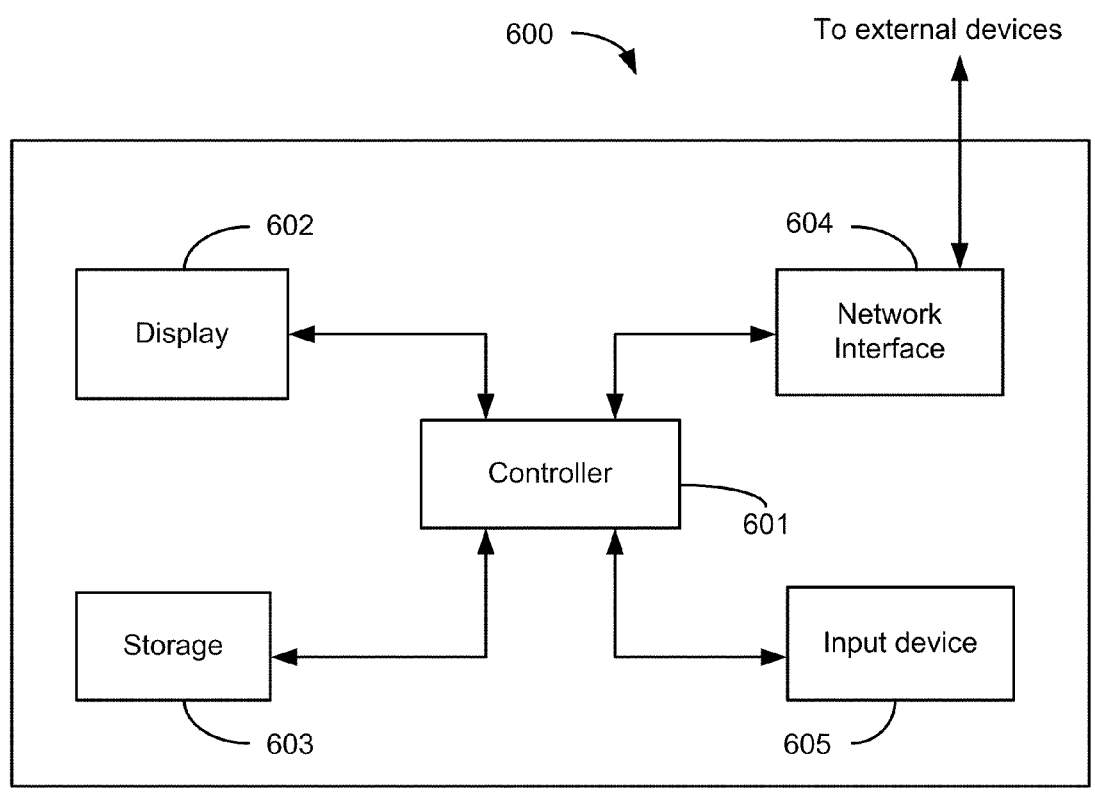
FIG. 6 is a block diagram of a remote control device for controlling a surveying instrument according to an embodiment of the present invention.

FIG. 6 illustrates a high-level block diagram of a remote control device 600 according to an embodiment of the present invention. Remote control 600 may include a controller 601, a display 602, a storage device 603, a network interface 604, and an input device 605. Controller 601 can be implemented using a processor or any combination of dedicated programmable logic circuits. Display 602 may be any display capable of displaying graphics. For example, display 602 may be a LCD screen or a touch screen that can display the area associated with the object and sections associated with the area. For example, display 601 may display the scanning results illustrated in FIGS. 3A-3I, in addition to other information. Storage device 603 may be implemented as any form of volatile or non-volatile memory. Storage device 603 may include program instructions that may be executed by controller 601. The program instructions may analyze the data received from the surveying instrument and send one or more instructions to the surveying instrument based on the analysis. In addition, storage device may store any information and data received from the surveying instrument. Network interface 604 may be used to communicate with the surveying instrument and other devices such as printers, other monitors, etc. Remote control 600 may communicate with the surveying instrument using any known wired or wireless communication channels including Bluetooth® and radio frequency communications. Input device 605 may provide the ability for a user to communicate information to remote control 600 that may be in-turn communicated to the surveying instrument. For example, input device 605 may be used to communicate the boundary points to the surveying instrument. Input device 605 may be a touch pad, touch screen, scroll wheel, click wheel, dial, button, keypad, microphone, or the like.

In some embodiments, remote control 600 may send instructions to the surveying equipment to scan one or more areas of the object that correspond to the one or more sections displayed on display 602. In addition, remote control 600 may receive results of the scanning from the surveying equipment and display the results on display 602. In some embodiments, remote control 600 may analyze the scan results and determine the next instruction(s) to be sent to the surveying equipment based on the analysis. For example, if remote control 600 receives input indicating that a particular section of the area associated with the object indicates presence of a portion of the object, it may send instructions to the surveying equipment to mark all the sections adjacent to that section for subsequent scanning In an embodiment, remote control 600 may control all operations of the surveying equipment. Remote control 600 of the present invention can be realized using any combination of dedicated components and/or programmable processors and/or other programmable devices, e.g., a general purpose computer, a portable computing device, or a handheld controller.

It should be noted that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for scanning a surface of an object using a total station, the method comprising:
   defining a set of coordinates to identify an area associated with the object;
   defining a plurality of sections within the area associated with the object, the plurality of sections forming an array having a first number of rows, each of the rows having a second number of sections;
   for each section of a first row of the array:
   a) positioning a scanning element of the total station to image a portion of the area associated with the object corresponding to a first section of the first row;
   b) designating one or more sections adjacent to the first section for subsequent scanning if a result of scanning the portion of the area associated with the object corresponding to the first section of the first row indicates presence of a first portion of the object;
   c) repeating steps a) and b) for subsequent sections of the first row;
   for a second row of the array:
   d) positioning the scanning element to image a portion of the area associated with the object corresponding to a first section of the second row;
   e) designating one or more sections adjacent to the first section of the second row for subsequent scanning if it is determined that the portion of the area associated with the object corresponding to the first section of the second row indicates presence of a second portion of the object; and
   f) designating one or more sections adjacent to the first section of the second row for no subsequent scanning if it is determined that the portion of the area associated with the object corresponding to the first section of the second row does not indicate presence of a portion of the object;
   g) repeating steps d), e), and f) for subsequent sections of the second row.

2. The method of claim 1 further comprising repeating steps d), e), and f) for remaining rows of the array.

3. The method of claim 2 further comprising, after completing scanning of all rows of the array:
   determining whether there is a section designated to be scanned but not already scanned; and
   if it is determined that there is a section designated to be scanned but not already scanned, scanning the section to determine presence of a portion of the object.

4. The method of claim 1 wherein designating one or more sections includes designating all sections adjacent to the first section.

5. The method of claim 1 wherein the first row is a bottom row in the array.

6. The method of claim 1 further comprising defining a first location in front of the object and a second location behind the object.

7. The method of claim 6 further comprising ignoring any object located beyond the first location and the second location for which a scan result is received.

8. The method of claim 1 wherein,
   if none of the sections in the first row indicate presence of a portion of the object, scanning the remaining rows of the array using steps a) and b) until it is determined that at least one section in the remaining rows indicates presence of a portion of the object.

9. An apparatus for scanning an object comprising:
   a surveying instrument including an optical imaging device configured for scanning an object; the surveying instrument comprising:
     a display device; and
     a processor configured to:
       receive input defining an area associated with the object, the area being defined as an array having a first number of rows, each of the rows having a second number of sections;
   for each section of a first row of the array, the processor is further configured to:
     (a) position the optical imaging device to scan a portion of the area associated with the object corresponding to a first section of the first row;
     (b) designate one or more sections adjacent to the first section for subsequent scanning if it is determined that the scan result of the portion of the area associated with the object corresponding to the first section of the first row indicates presence of the portion of the object; and
     (c) repeat steps (a) and (b) for subsequent sections of the first row; for a second row of the array, the processor is further configured to:
     (d) position the optical imaging device to scan a portion of the area associated with the object corresponding to a first section of the second row;
     (e) designate one or more sections adjacent to the first section of the second row for subsequent scanning of it is determined that the portion of the area associated with the object corresponding to the first section of the second row indicates presence of a second portion of the object;
     (f) designate one or more sections adjacent to the first section of the second row for no subsequent scanning if it is determined that the portion of the area associated with the object corresponding to the first section of the second row does not indicate presence of a portion of the object; and
     (g) repeat steps (d), (e), and (f) for subsequent sections of the second row.

10. The apparatus of claim 9 wherein the processor is further configured to display the array on the display device.

11. A system for scanning an object, the system comprising:
    a surveying instrument having an imaging device; and
    a first device coupled to the surveying instrument and including a display unit and a controller, wherein the controller is configured to:
      send a first instruction to the surveying instrument, the first instruction defining an area associated with an object to be scanned, wherein the area includes in a plurality of rows, each row including a plurality of sections;
    for a first row in the plurality of rows, the controller is configured to:
      (a) send a second instruction to the surveying instrument, the second instruction instructing the surveying instrument to scan a first section of the first row;
      (b) receive input from the surveying instrument, the input indicating presence of a portion of the object the first section;
      (c) send a third instruction to the surveying instrument to designate one or more sections adjacent to the first section for subsequent scanning;
      (d) send instructions to the surveying instrument to repeat steps (a)-(c) for the remaining sections of the first row;
    for a second row in the plurality of rows, the controller is configured to:
      (e) send a fourth instruction to the surveying instrument to scan a first section of the second row;
      (f) send a fifth instruction to the surveying instrument to designate one or more sections adjacent to the first section of the second row for subsequent scanning if it is determined that the first section of the second row indicates presence of a second portion of the object;
      (g) send a sixth instruction to the surveying instrument to designate one or more sections adjacent to the first section of the second row for no subsequent scanning if it is determined that the first section of the second row does not indicate presence of a portion of the object; and
      (h) repeat steps (e)-(g) for subsequent sections of the second row.

12. The system of claim 11 wherein the first device is configured to remotely control the surveying instrument using a wired or a wireless connection.

13. The apparatus of claim 9 further wherein after completing scanning of all rows of the array, the processor is further configured to:
    determine whether there is a section designated to be scanned but not already scanned; and
    if it is determined that there is a section designated to be scanned but not already scanned, scan the section to determine presence of a portion of the object.

14. The apparatus of claim 9 wherein the processor is configured to designate all sections adjacent to the first section.

15. The apparatus of claim 9 wherein the first row is a bottom row in the array.

16. The apparatus of claim 9 wherein the processor is further configured to define a first location in front of the object and a second location behind the object.

17. The apparatus of claim 16 wherein the processor is configured to ignore any object located beyond the first location and the second location for which a scan result is received.

18. The apparatus of claim 9 wherein,
if none of the sections in the first row indicate presence of a portion of the object, the processor is configured to scan the remaining rows of the array using steps (a) and (b) until it is determined that at least one section in the remaining rows indicates presence of a portion of the object.

19. The system of claim 11 wherein the controller is configured to send a seventh instruction to the surveying instrument for defining a first location in front of the object and a second location behind the object.

20. The system of claim 19 wherein the controller is configured to send an eighth instruction to the surveying instrument to ignore any object located beyond the first location and the second location for which a scan result is received.

\* \* \* \* \*